Jan. 4, 1938.                J. D. ZAHM                2,104,687
                             ANIMAL TRAP
                         Filed May 17, 1935           6 Sheets-Sheet 1

INVENTOR
Joseph D. Zahm
BY
Louis ———— Whitaker
ATTORNEY

Jan. 4, 1938. J. D. ZAHM 2,104,687
ANIMAL TRAP
Filed May 17, 1935 6 Sheets-Sheet 2

Jan. 4, 1938. J. D. ZAHM 2,104,687
ANIMAL TRAP
Filed May 17, 1935 6 Sheets-Sheet 3

INVENTOR
Joseph D. Zahm
BY
ATTORNEY

Jan. 4, 1938. J. D. ZAHM 2,104,687
ANIMAL TRAP
Filed May 17, 1935 6 Sheets-Sheet 5

Jan. 4, 1938.  J. D. ZAHM  2,104,687
ANIMAL TRAP
Filed May 17, 1935  6 Sheets-Sheet 6

UNITED STATES PATENT OFFICE 2,104,687

ANIMAL TRAP

Joseph D. Zahm, Lititz, Pa., assignor to Animal Trap Company of America, Lititz, Pa., a corporation of Pennsylvania Application May 17, 1935, Serial No. 21,934

25 Claims. (Cl. 43—88)

My invention consists in the novel features hereinafter described, reference being had to the accompanying drawings which illustrate several embodiments of the same, selected by me for purposes of illustration, and the said invention is fully disclosed in the following description and claims.

Animal traps now and for many years have been provided with metallic springs for the operation of the jaw or jaws of the trap. Particularly in the case of the so-called steel traps so largely used in trapping fur bearing and other wild animals, the provision of suitable springs presents the most serious difficulty. Great care is necessary in the selection of the material, usually spring steel, and in properly tempering it. Even with the greatest care and accurate tempering methods these springs frequently break, if too highly tempered, and if insufficiently tempered they are soft and useless. Furthermore, in the use of such traps the springs frequently deteriorate by exposure to the elements and to various chemical reactions, due to soil or water conditions. This occurs especially in coastal waters, where these traps are largely set under water, and where there exists an acid condition which eats into the grain of the steel causing weakening of the grain structure.

My present invention consists in providing an improved trap in which steel springs may be eliminated and in which the motivating mechanism comprises a body of highly elastic material, such as resilient rubber, in combination with means for distorting the body and means cooperating therewith and releasable by an animal for holding the body in distorted energy storing position, together with means for transmitting the stored energy of said distorted body to the jaw or jaws of the trap when the trap is sprung.

In connection with the body of elastic material I preferably employ a pivoted member, operatively associated therewith, which may be the trap jaw itself, but is usually an arm or lever operatively connected with the trap jaw or jaws, for transmitting the stored energy of the deformed elastic material to said jaw or jaws.

I also provide means for retaining the elastic block or body in operative relation with the other parts of the trap while affording room for accommodating the elastic body in its compressed, expanded or deformed condition when under tension.

I also prefer to provide, in connection with the elastic block or body, a closed air pocket in which the air is compressed when the elastic block or body is placed under tension, so that the force exerted by the compressed air may be added to the force of the resiliency of the elastic block or body and transmitted to the jaw or jaws of the trap. In carrying out this feature of my invention, I may provide such air pocket by forming a recess in the block or body, the edges of which sealingly engage an imperforate base plate or other portion of the trap, or I may provide such a recess in the imperforate portion of the trap engaged by the block or body, or I may provide cooperating recesses in both.

My invention also comprises certain novel features of construction and combination of parts hereinafter fully described and particularly pointed out in the claims.

In the accompanying drawings, which illustrate several embodiments of my invention, Fig. 1 is a top plan view of a steel trap of the so-called jump type having my invention embodied therein and showing the trap in the unset or sprung position.

Fig. 2 represents a vertical longitudinal section on line 2—2 of Fig. 1, showing an elastic block or body adapted to be compressed in the setting of the trap.

Fig. 3 is a vertical transverse section on line 3—3 of Fig. 2.

Fig. 4 is a sectional view, similar to Fig. 2, but showing the trap in the set position.

In Figs. 1 to 6 inclusive I have shown my invention applied to what is known in the trade as the jump type of trap, in which the arm which engages and operates the jaws, extends across the trap above the base plate instead of projecting at one side of the trap, as in the so-called long spring type. In these figures, 1, represents the base plate, provided on opposite ends with upturned bearing portions, 2, provided with the usual bearing apertures to receive the usual pivotal portions, 3, of a pair of trap jaws, 4—4. The base plate is shown in this instance as provided at opposite sides with vertical extending flanges, indicated at 1a, which flanges stiffen the base plate and also serve to prevent lateral movement of the elastic compressible block or body, hereinafter described.

5 represents a jaw closing arm or lever, which is pivotally connected with the base or frame, 1, of the trap adjacent to one end thereof in any usual or desired manner. In this instance the base, 1, is provided at one end with a slot, 1b, which receives an ear, 6, forming part of the closing arm, 5. This ear, 6, is preferably narrower than the arm or lever, which latter is provided with a vertically disposed portion or shoulder, 7, arranged at an angle to the said ear, and also to the other portions of the arm or lever, as clearly shown in the drawings. Adjacent to its opposite end the said closing arm, 5, is provided with an opening or slot, indicated at 8, which extends on opposite sides of the jaws and holds them in the closed position when the trap is not set. The opposite edges of the closing arm, 5, are also provided with downwardly extending flanges, indicated at 9, which stiffen the arm or lever, and at the same time serve to prevent lateral movement of the elastic compressible block or body, indicated at 10, and located as shown between the closing arm, 5, and the base plate, 1, and adjacent to the hinge connection of said arm or lever. The exterior portion of the ear, 6, which extends through the slot, 1b, of the base, is conveniently provided with an aperture, 6a, to receive a swivel, 20, to which a chain, 21, may be attached in the usual manner for the purpose of anchoring the trap.

Figure 6:
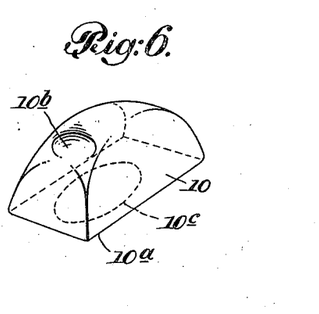
Fig. 6 is a detail perspective view of the block of elastic compressible material shown in the preceding figure, drawn to an enlarged scale.

The elastic block or body, 10, as before stated, is preferably made of rubber or rubber composition, or other suitable material, of such character as to store up the required energy, when compressed by the depression of the arm or lever, 5, into set position (indicated in Fig. 4,) so that when released from compression, it will elevate the arm or lever, 5, and close the jaws with the requisite degree of force to securely hold the trapped animal. The elastic block or body, which is shown in detail in Fig. 6, is provided with flat bottom portions, 10a, to sealingly engage the base plate, and the block is of substantially the width at its bottom portion, to lie within the lateral flanges, 1a, of the base plate, and of sufficient width at the top to lie between the lateral flanges, 9, of the closing arm, 5, so that it is firmly held against lateral movement. It is also desirable to hold the elastic body against longitudinal movement with respect to the engaged parts. This may be accomplished in any one of several ways. In Figs. 1 to 6 I have shown the closing arm, 5, provided with a depressed portion, indicated at 11, which engages a corresponding recess, 10b, in the elastic block, thus securely holding the latter in operative position between the base plate and the closing arm, 5. In these figures I have shown the lower face of the elastic block between its lateral edges and between its end edges, with a recess, 10c, indicated in dotted lines in Fig. 6 for the double purpose of facilitating the compression of the elastic block or body, and also to form part of an air pocket between the elastic block or body and the base, in which air is compressed when the block or body is compressed, so as to add its force to the inherent resiliency of the block or body. In this instance I have also shown the base plate, 1, provided with a depressed portion beneath the elastic block or body, as indicated at 1c, thus forming in effect a recess in the base plate coinciding with the recess, 10c, in the elastic block or body, and increasing the size of the recess or air pocket. I wish it to be understood, however, that in some instances the recess forming this air pocket may be formed entirely in the metal base plate, and in some instances it may be formed entirely in the block or body, as well as being formed partly in the base plate and partly in the block or body, as indicated in the present drawings, see particularly Figs. 2, 3 and 4.

It will be understood that the trap will be provided with the usual trigger mechanism, and in this instance I have shown a conventional trigger mechanism, comprising a bait pedal, 12, having an arm, 12a, pivoted at 13, to a laterally extending bar, 14, secured to and projecting on one side of the base plate, 1, and having an upwardly extending portion, 15, to which is pivotally connected the trigger, 16, adapted to engage a notch, 17, in the arm, 12a, of the bait pedal. I do not limit myself, however, to the particular form of trigger mechanism herein shown and described.

Figure 5:
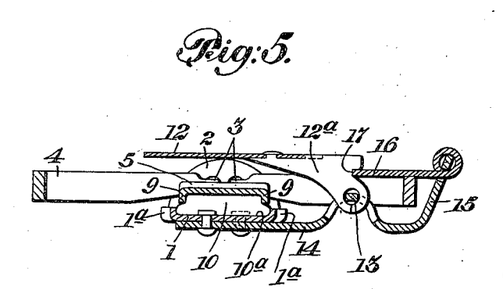
Fig. 5 is a vertical transverse section on the line 5—5 of Fig. 4.

It will be understood that in setting the trap, the closing arm, 5, is depressed into the position shown in Figs. 4 and 5, so as to bring the slot, 8, below the adjacent pivotal portions, 3, of the jaws, and permit the jaws to swing apart and into horizontal positions, as indicated in Figs. 4 and 5, when the trigger, 16, is placed in operative position above one of the jaws, as shown in Fig. 5, and engaged with the bait pedal, in the usual manner. As shown in Fig. 4, when the closing arm, 5, is depressed to set the trap, the elastic block or body, 10, is placed under heavy compression, while at the same time the air pocket previously described facilitates the compression of the elastic material and simultaneously compresses the air in the air pocket. Upon release of the trigger mechanism by depressing the bait pedal, the arm or lever, 5, will be moved upwardly with great force, and the opposite sides of the slot, 8, engaging the exterior edges of the jaws, will bring them together with great force.

It will be noted that in the trap just described, there is no metallic spring member, the spring feature of the trap being supplied by the block or body of elastic material, which in this instance is placed under compression, acting in conjunction with a freely pivoted arm or lever, 5, to transmit the stored energy of the elastic block to the jaws. It has been found in actual practice and after severe tests that the bodies of elastic material are not affected to any extent over long periods, and are absolutely impervious to any and all acid or other chemical conditions which are encountered in the use of such traps. There is no tempered spring to break, and as a matter of fact, immersion of the traps in water tends rather to preserve the elastic compressible bodies than to injure them. It has also been found that in regard to holding power, the traps equipped with the elastic blocks or bodies acting on the jaws in lieu of steel springs have greater holding power than the regular traps equipped with steel springs. In this connection it may be noted that in my improved traps the closing lever is of rigid material throughout its entire length, so that the force exerted by the elastic block or body (with the addition of the force of the compressed air where the air pocket is provided) is transmitted in an extremely direct and unyielding manner to the jaws, whereas in the ordinary steel trap, the closing arm is a part of the spring and is ordinarily more or less resilient throughout its entire extent.

In order to facilitate the lateral expansion of the elastic body, 10, when it is placed under compression, it is desirable of course to provide sufficient space around the body for that purpose, and as indicated in Fig. 2, the body, 10, is preferably positioned so that there is a certain amount of space between its inner end and the shoulder, 7, of the closing arm to permit the endwise expansion of the material of the body, 10, under compression. Obviously it can expand freely in the opposite direction, as it is not confined and it can also expand laterally if necessary, between the closing arm and the base plate, 1. As before stated, the recess, 10c, or 1c, or both, also facilitate the compression of the body, 10, and accommodate it in its compressed condition.

This prevents the shifting of the bottom surfaces of the body, 10, in sealing engagement with the base plate to any material extent, which might otherwise open up the air pocket if such air pocket is provided.

Figure 7:
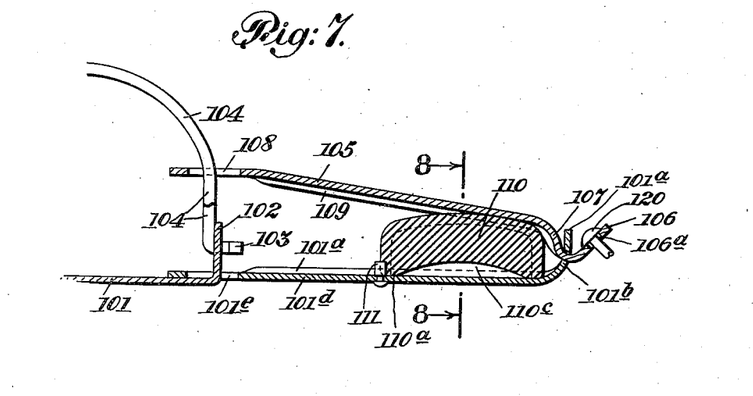
Fig. 7 is a partial central longitudinal sectional view of what is termed a long spring trap provided with an elastic block or body, also adapted to be compressed in setting the trap.
Figure 8:
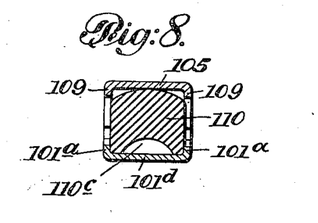
Fig. 8 is a vertical transverse section on line 8—8 of Fig. 7.
Figure 9:
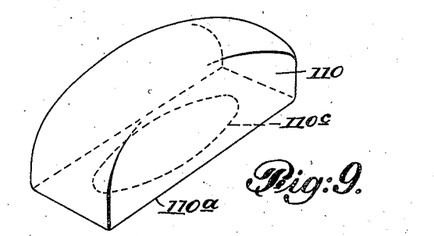
Fig. 9 is a detail perspective view of the elastic block or body shown in Figs. 7 and 8, and drawn to an enlarged scale.

In Figs. 7, 8 and 9 I have illustrated my invention embodied in a trap corresponding to the usual long spring trap, in which the jaw closing mechanism is located outside of the base plate and extending at one end, or in some instances at both ends therefrom. In these figures, the corresponding parts to those previously described, are given the same reference numerals with the addition of 100.

The base plate, 101, the bearing portions, 102, and jaws, 104, are constructed as previously described, or in any other usual or desired manner. In this instance I have shown the base plate, 101, provided with an extension plate, 101d, having upwardly extending lateral flanges, 101a and having its outer end bent upwardly and provided with a pivotal aperture, 101b. The inner end of the extension plate, 101d, may be riveted or brazed or welded, or otherwise rigidly secured to or formed with the base plate, 101, if desired, but for convenience I prefer to provide it with an aperture, 101e, which is slipped over the adjacent bearing portion, as indicated in Fig. 7, the width of the bearing portion being substantially the same as the diameter of the aperture which is preferably circular. 105 represents the closing arm, provided with the downwardly extending flanges, 109, and having at its inner end the aperture, 108, to engage the jaws, 104, in the usual manner. The outer end of the closing arm is provided with a downwardly extending shoulder, 107, and the arm is pivotally connected with the outer end of the extension plate, 101d, in any desired manner. In this instance, as in the construction illustrated in the preceding figures, the closing arm is provided with an ear, 106, extending through the aperture, 101b in the upturned end of the extension plate, 101d, which forms a very practical and simple connection. 110 represents the elastic body which is inserted between the upper surface of the extension, 101d, and the lower surface of the closing arm, being held against lateral movement by the flanges, 101a and 109, which also stiffen the respective parts. The body, 110, is shown as curved lengthwise on its upper surface and provided on its lower surface with a recess, indicated at 110c, to form an air pocket between it and the extension plate, in the manner previously described. The body, 110, has its longitudinal movement limited in one direction by the shoulder, 107, and in this instance I have shown the stop, 111, in this instance secured to the base plate by riveting or otherwise, and in this instance slightly indenting the inner end of the body, 110, as shown in Fig. 7. The body may be recessed to engage the stop. The opposite end of the body, 110, is free to expand into the space afforded between it and the inner surfaces of the shoulder, 107, and the upturned portion of the extension plate.

The operation of the trap will be exactly as hereinbefore described with reference to the jump type trap. I have shown the ear, 106, provided with an aperture, 106a, for the attachment of a chain in the usual manner.

Figures 10, 11:
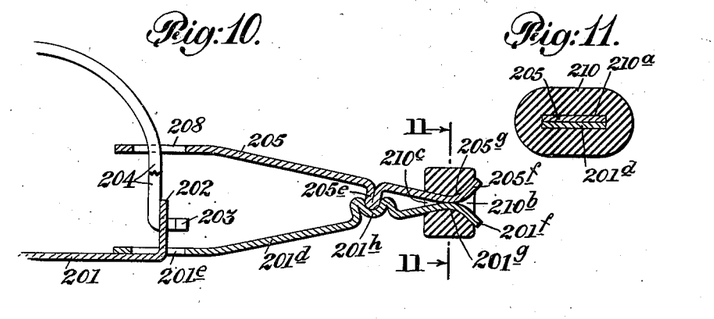
Fig. 10 is a view similar to Fig. 7 showing the long spring trap provided with an elastic block or body adapted to be expanded in the setting of the trap.
Fig. 11 is a vertical transverse section on line 11—11 of Fig. 10.

In Figs. 10 and 11, in which the parts corresponding with those hereinbefore referred to with reference to Figs. 1 to 6 inclusive, are given the same reference numerals with the addition of 200, I have shown a form of apparatus in which an elastic body is expanded or placed under tension instead of compression. The particular trap illustrated in Fig. 10 is of the form somewhat corresponding to what is termed the long spring type, in that the closing arm, 205, and the extension plate, 201d, extend exterior to the jaws and at one or both ends of the trap. In this instance the quasi pivotal connection or fulcrum between the closing arm, 205, and extension plate, 201d, is formed by a transverse groove or socket, 201h, suitably formed in the extension plate and engaged by a projection, 205e, in this instance formed by bending a portion of the arm downwardly and back again upon the bended portion indicated in the drawings. The portions of the arm, 205, and extension plate, 201d, beyond the pivotal connection, preferably come into contact when the trap is in the closed position, and the portions of the said parts extending beyond the point of contact are bent in opposite directions, as indicated at 205f and 201f, thus forming oppositely disposed curved recesses, indicated respectively at 205g and 201g. The body or block, 210, of rubber or other elastic material, is in this instance provided with a central aperture, 210a, of a normal width substantially equal to that of the closing arm, 205, and extension plate, 201d and of a height at approximately the center of the body equal to the combined thicknesses of the two parts, the aperture, 210a, being preferably of greater height adjacent to the opposite transverse faces of the block or body, as indicated at 210b and 210c, to accommodate the oppositely diverging portions of the closing arm, 205, and extension plate, 201d, as clearly shown in Fig. 10. The curved portions of the closing arm and extension plate adjacent to the points where these members contact in rear of the hinge member, form oppositely disposed curved recesses which are thus engaged by corresponding curved portions of the block, 210, above and below the slot, 210a, and thus the block or body is positioned against movement longitudinally of the arm and extension plate.

It will be seen that when the closing arm, 205, is depressed the outer ends of the said arm and extension plate will be separated and thus expand the lateral portions of the block or body, 210, and place them under heavy tension as the trap is set in the usual manner hereinbefore described. Immediately on the release of the trigger member, the closing arm will be forced upwardly to close the jaws of the trap in exactly the same manner as previously described.

Figure 12:
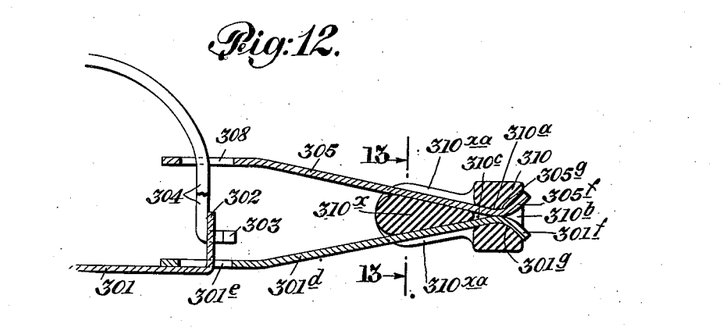
Fig. 12 is a view similar to Figs. 7 and 10 showing a long spring trap provided with a body of elastic material adapted to be compressed in the setting of the trap, and a similar body adapted to be expanded in the setting of the trap, said elastic bodies being in this instance formed integrally with each other.
Figure 13:
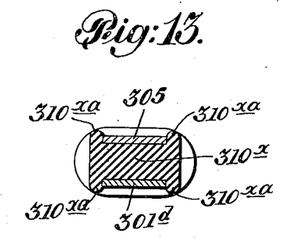
Fig. 13 represents a vertical section on line 13—13 of Fig. 12.
Figure 14:
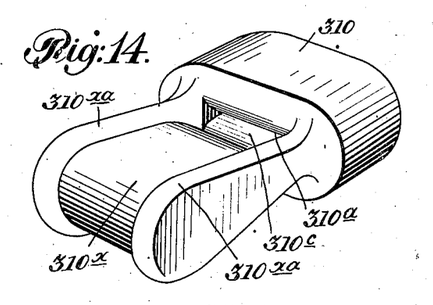
Fig. 14 is a detail perspective view of the combined compressible and expansible elastic bodies formed integrally, as shown in Fig. 12, and drawn to an enlarged scale.
Figure 15:
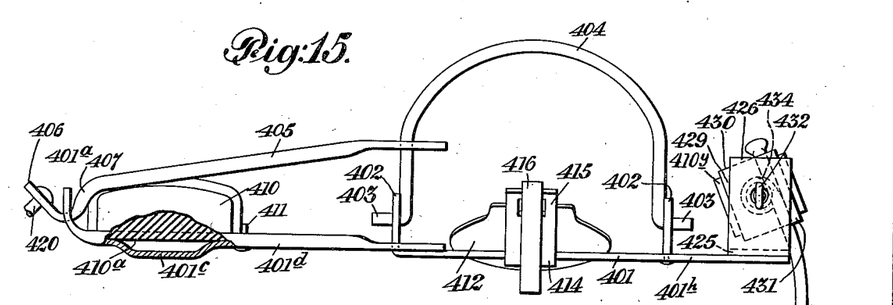
Fig. 15 represents a trap of the so-called long spring type, shown in released position, and provided with a pivoted guard for preventing "ring off", and having my invention applied both to the jaw closing means and the means for actuating the guard, in the latter of which the elastic body is subjected to torsional strain.
Figure 16:
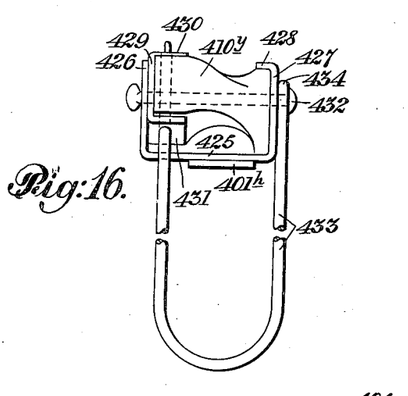
Fig. 16 is a partial end view of the trap shown in Fig. 15, illustrating the means for actuating the guard when in released position.
Figure 17:
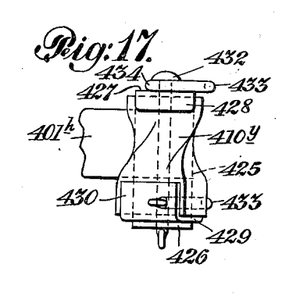
Fig. 17 is a top plan view of the parts shown in Fig. 16.

In Figs. 12, 13 and 14, in which the parts corresponding with those in Figs. 1 to 6 inclusive, are given the same reference numerals with the addition of 300, I have shown a further modification, in which the closing arm of a steel trap of the same type as shown in the immediately preceding figures, is acted upon by bodies of elastic material, one of which is placed under compression, and the other of which is placed under tension when the trap is set, and in this instance the bodies of elastic material are united in an integral structure, although this is not essential, and they might be formed separately if desired.

In these figures the closing arm, 305, is provided at its outer end with an upwardly curved portion, 305f, forming the curved recess, 305g, and the extension plate, 301d, which contacts with the closing arm adjacent to its outer end is provided with a downwardly extending portion, 301f, forming the recess, 301g, said recesses engaging portions of a block or body, 310, of elastic material, on opposite sides of a central slot, 310a, which is formed exactly as illustrated in Fig. 10 and previously described. A wedge shaped block or body, 310x, fits between the closing arm, 305, and extension plate, 301d, forming a fulcrum for the closing arm, as shown in Fig. 12, and in this instance is held against lateral movement by integral flanges, 310xa, as clearly shown. These lateral flange portions are formed in this instance integral with the body, 310, as clearly shown in Fig. 14, thereby holding the body, 310x, against longitudinal movement with respect to the closing arm, 305, and extension plate, 301d. It will be obvious that when the closing arm, 305, is depressed in setting the trap, the elastic body, 310x, will be placed under compression, and the elastic body, 310, will be placed under tension or expansion, and that when the trap is sprung, both elastic bodies will exert their stored energy on the closing arm, 305, tending to move its jaw engaging end in a direction away from the extension plate, 301d, and forming a very effective means of closing the trap. Obviously the bodies, 310 and 310x, could be formed separately if desired, in which case the body, 310x, would be held from longitudinal movement in any of the ways previously illustrated as, for example, by an interlocking projection on the closing arm, engaging a recess in the block or body, as in Figs. 1 to 6 inclusive, or by a suitable stop provided on the extension plate, 301d, as in Fig. 7. It will also be understood that the block or body, 310x is held against lateral movement by means of lateral flanges on the closing arm, 305, or extension plate, 301d, or both, as illustrated for example in Figs. 1 to 6 inclusive, in which case the flanges, 310xa would be eliminated.

In some instances a trap member may be actuated by a block or body of elastic material, which has been subjected to torsional compression or strain if this is found convenient or desirable. In Figs. 15 to 18 inclusive, in which the parts corresponding with those shown in Figs. 1 to 6 inclusive, are given the same reference numerals with the addition of 400, I have shown a steel trap of the type illustrated in Letters Patent of John U. Lehn, No. 1,912,457, dated June 6, 1933, in which the trap is provided with a movable leg embracing guard for the purpose of preventing "ring off". It will be understood that I make no claim to any subject matter relating to this trap described or claimed in the patent to John U. Lehn above referred to, but show it for the purpose of illustrating a further embodiment of my present invention.

The trap proper shown in these figures is constructed exactly in accordance with the trap illustrated in Figs. 7, 8 and 9, except that in this instance the extension plate, 401d, is shown provided with a depressed portion, 401c, beneath the block or body, 410, forming an air pocket, the lower surface of the block in this instance being flat, although it could be provided with a recess as shown in Figs. 7, 8 and 9. I will, therefore, not again describe the construction and operation of the trap proper. In this trap the base plate, 401, is provided with an extension, 401h, on which is mounted a transverse bracket, 425, provided at one side with a vertically disposed bearing portion, 426, and on the opposite side with a bearing portion, 427, having at its upper end a horizontally extending lip, 428, see Figs. 16 and 18. 410y represents a block or body of elastic material, the end portions of which are preferably rectangular in form, one end engaging the bearing portion, 427, and held against rotation by the bottom plate of the bracket, 425, and the lip, 428, while the other end of the block is also of rectangular form and engages a rotatable metal clip, 429, provided with guiding lips, 431. A pivot pin or shaft, 432, extends through the bearing portions, 426, 427, and centrally through the clip, 429, and through the elastic block or body, 410y, as clearly shown in the drawings. 433 represents the ring off preventing guard, formed as a loop of metal, one end of the loop having an eye, 434, engaging the pivot pin, 432, outside of the bearing plate, 427, while the opposite end is passed through apertures in the lips, 430, 431, of the ear, and transversely through the body, 410y, slightly to one side of the pivot, 432, as clearly shown in the drawings. The central portion of the block or body, 410y, is also substantially rectangular in cross section, and may be slightly inwardly curved at its lateral faces, if desired, although this is not essential.

Figure 18:
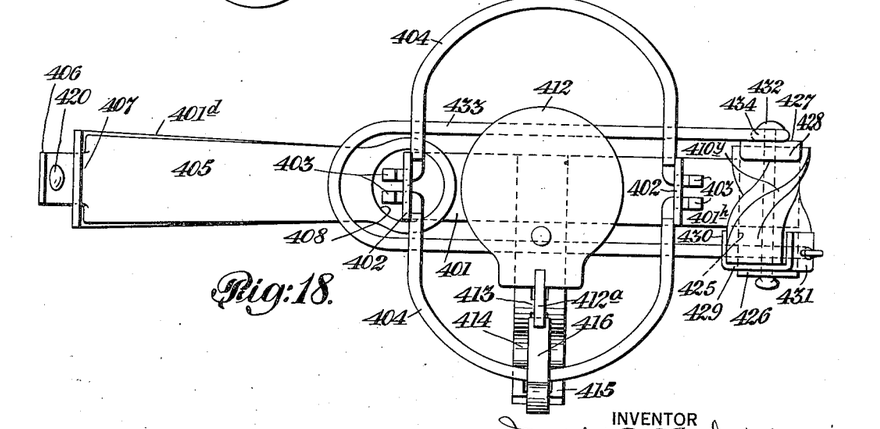
Fig. 18 shows the trap of Fig. 15, in set position.

In setting the trap, as shown in Fig. 18, the closing arm, 405, is depressed, placing the block or body, 410, under compression, in the manner previously described with reference to Figs. 7, 8 and 9, and at the same time the guard is rotated counterclockwise into a horizontal position on the opposite sides of the jaws and the outer end of the loop is brought down on the upper face of the closing arm. This, as will be readily seen, twists the block or body, 410y, one end of which is held against rotation by engagement with the lip, 428, and the bottom of the bracket, 425, while the other end is rotated by the clip 429. The jaws are then opened over the guard and one of the jaws is placed in control of the trigger, in the same manner as previously described with reference to Figs. 1 to 6. It will be obvious that upon the release of the trigger, the closing arm will be actuated by the compressed elastic body, 410, so as to close the jaws of the trap upon the leg of the animal, while the closing of the jaws will release the guard, 433, which slides up the leg of the animal under torsional action of the body, 410y, until it engages the body of the animal, when it holds it in such position that it cannot release itself from the trap, in the manner described in the Lehn patent previously referred to.

Figures 19, 20, 21:
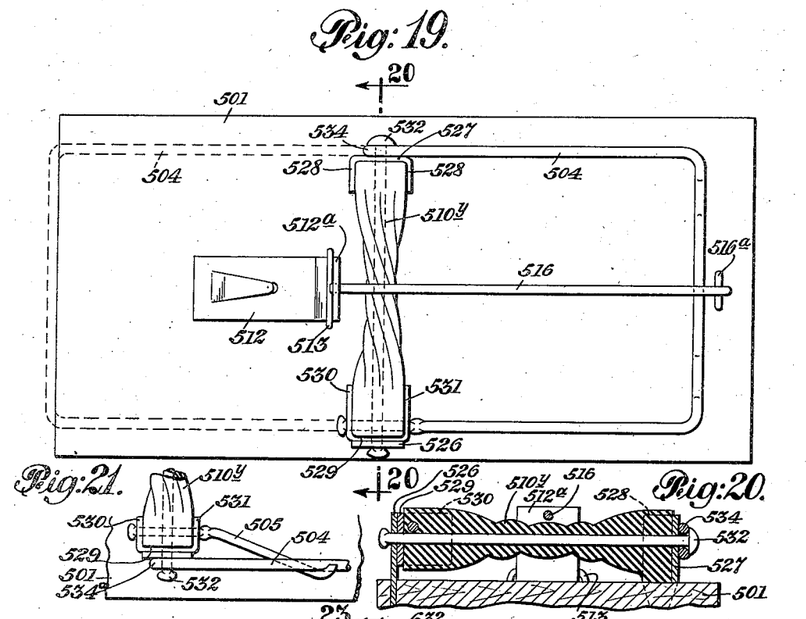
Fig. 19 is a plan view of a form of trap in which the elastic body is subjected to torsional strain and is operatively connected directly with a trap jaw.
Fig. 20 is a transverse section on line 20—20 of Fig. 19.
Fig. 21 is a detail drawing illustrating a slight modification.

In Figs. 19 to 21 inclusive, in which the corresponding parts are given the same reference numerals as in Figs. 1 to 6 with the addition of 500, I have shown an embodiment of my invention in which a body of elastic material is subjected to torsional strain in the setting of the trap, and in which the stored energy of the elastic body is communicated directly to one of the trap members, to wit, a pivoted jaw or striker. In these figures, for example, the elastic body, 510y, is held against rotation at one end by means of a bearing plate, 527, provided in this instance with lateral ears, 528, the bearing plate, 527, being secured in any desired manner to the base 501, of the trap, which in this case may be a block of wood. The opposite end of the elastic body is held in a rotatable metal clip 529, provided with flanges, 530, 531, on two opposite sides of the elastic body, which is generally of rectangular cross section. Adjacent to the clip, 529, is a second bearing plate, 526, which in this instance is also secured to the base, 501. A pivot, 532, extends through the bearing plates and through the clip, 529, and longitudinally through the elastic body, in the same manner as shown in Figs. 15 to 18.

A jaw or striker, 504, is mounted pivotally with respect to the base, 501, one end in this instance having a loop, 534, engaging the pivot outside of the bearing plate, 527, the other end of the jaw extending through the flanges, 530, 531, of the clip, 529, and through the end portion of the elastic body, 510y, between said flanges, as indicated in Fig. 19, and is secured with respect to the clip in any desired manner, as by swaging or otherwise. The particular trap shown is provided with a locking bar, 516, one end of which is pivotally secured to the base in this instance by a staple, 516a, engaging a loop in one end of the locking bar, and this bar is adapted to extend over the bail when in the set position, as shown in Fig. 19, and to engage a notch or recess in a vertical portion, 512a, of a bait pedal, 512, in this instance pivoted on the base plate in the usual and well known manner, by means of a staple, 513.

The dotted position at the left in Fig. 19 shows the normal sprung or closed position of the jaw, 504. The trap is set by swinging the jaw, 504, from the dotted position over into the position shown at the right in full lines in that figure, with the result that one end of the elastic body will be held against rotation by the bearing plate, 527, and its flanges, 528, while the other end of the elastic body will be rotated with the clip, 529, thus subjecting the elastic body to severe torsional strain, and distortion, and storing up therein the energy for returning the jaw to closed position. The jaw is held in set position by the locking bar and trigger as shown in Fig. 19, in a well understood way. The particular details of this trap form no part of my present invention and are not claimed herein. In this instance it will be seen that the torsional stress of the elastic body is applied directly to the jaw instead of through the instrumentality of a closing lever, but it will be understood that the energy of the torsionally distorted elastic block or body might, in this type of trap, be applied through the instrumentality of a closing or actuating arm as well, as illustrated in Fig. 21, which shows the rotary clip, 529, provided with a closing arm or actuating arm, 505, having a curved portion engaging the adjacent arm of the jaw, 504, which in this instance is also provided with an eye, 534a, directly engaging the pivot, 532. Obviously on the release of the trigger, the jaw, 504, will be in either case swung into the closed position with great force.

Figures 22, 23:
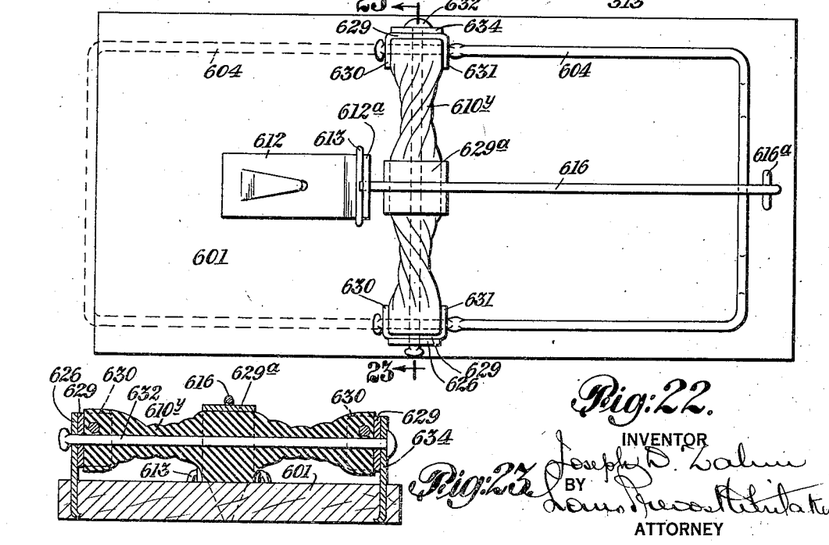
Fig. 22 is a view similar to Fig. 19 illustrating a modification of the trap shown in said figure.
Fig. 23 is a transverse section on line 23—23 of Fig. 22.

In Figs. 22 and 23, in which the parts corresponding with those previously described with reference to Figs. 1 to 6 inclusive, have been given the same reference numerals with the addition of 600 to avoid repetition, I have shown another embodiment of my invention similar to that shown in Figs. 19 to 21, except that in this case each of the rectangular ends of the elastic body, 610y, is provided with a rotary clip, 629, which is directly connected to the adjacent end of the jaw, 604, in the manner described with reference to the preceding figures, and the pivot pin, 632, extends through bearing plates, 626 and 634, secured to the base, 601. In this instance the central portion of the elastic body is also of rectangular form and is engaged by a central clip, 629a, secured to the base and holding the central portion of the elastic body against rotation. Otherwise the trap is constructed exactly like that illustrated in Figs. 19 to 21 inclusive.

In this instance when the jaw is moved to set position it will effect a rotation of each end of the elastic body, 610y, while the central portion will be held by the clip, 629a, against rotation, thus placing the portions of the elastic body on opposite sides of the central clip, 629a, under torsional strain, which will be communicated alike to each arm of the jaw, 604, either directly as shown or through the instrumentality of a closing bar, as illustrated in Fig. 21, as may be preferred.

Figure 24:
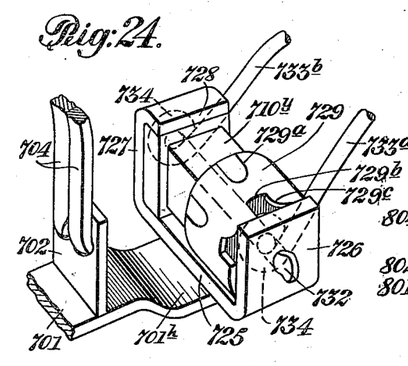
Fig. 24 is a partial perspective view of a modification of my invention applied to a leg guard of the type shown in Figs. 15 to 18 inclusive.

In Fig. 24, in which the parts corresponding with those shown in Figs. 1 to 6 inclusive are given the same reference numerals with the addition of 700, I have shown another modification of my invention, in which the body of elastic material is subjected to torsional strain, and is here shown operatively connected with a leg embracing guard of the kind illustrated in Figs. 15 to 18 inclusive.

In Fig. 24 the elastic body, 710y, which as shown in square in cross section in its middle portion, has one end, also rectangular, firmly held against rotation between the bracket 725 and the flange 728 on the bearing portion, 727. The opposite end of the elastic body is engaged by a collar, 729, which has an aperture, preferably square or polygonal, and notches, 729a, in the surrounding edges, into which the end of the elastic body fits, so as to connect it to the collar without the use of a cross pin, and thus preventing the possibility of splitting or tearing the elastic material. The outer end of the collar, 729, is also provided with notches 729b to engage the adjacent arm, 733a, of the guard. One edge of each of these notches is sloping, as indicated at 729c so that the notches act as a ratchet permitting the end of the elastic body to be turned with the collar, 729, to wind up or increase the tension of the torsional spring constituted by the elastic body. The arms, 733a and 733b, of the guard are formed with loops, 734, which engage a pivot pin, 732, extending longitudinally through the elastic body and through apertures in the bearing portions, 726 and 727.

Figure 25:
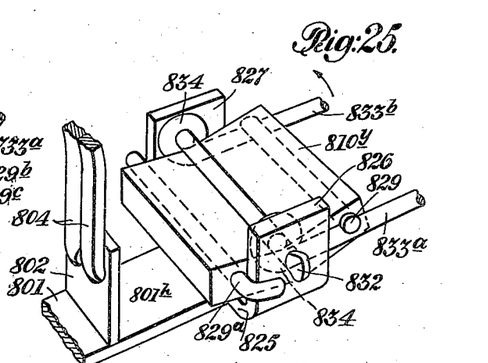
Fig. 25 is a view similar to Fig. 24 showing another modification of my invention applied to a similar purpose.

In Fig. 25 the elastic body is shown as a thick block, and the parts in this figure corresponding with those illustrated and described with reference to Figs. 1 to 6 inclusive, are given the same reference numerals with the addition of 800. Thus the block, 810y, is bent upon itself to provide the spring action. It is shown applied to a guard similar to that of Fig. 24, the arms, 833a and 833b, of which are pivoted upon a pin, 832, engaging apertures in the bearing portions, 826 and 827, of the bracket, 825. In this instance the elastic body is slipped under the pin, 832, which engages it centrally. The block is provided at one end with an inserted pin, 829, the ends of which engage the arms of the guard, and the other end of the block may be provided with a similar pin, 829a, engaging the bearing portions of the bracket. When the guard is swung in the direction of the arrow the elastic body will be folded upon itself around pin, 832, and placed in a state of tension instead of torsion, but the effect upon the guard when released will be the same.

Figures 26, 27:
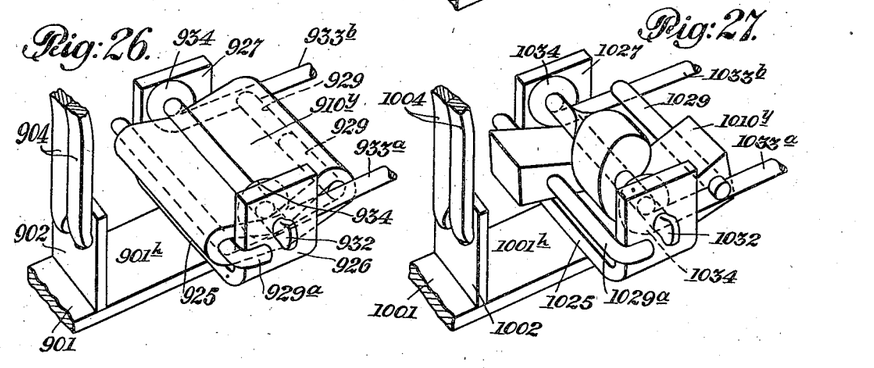
Fig. 26 is a similar view to Figs. 24 and 25 showing another modification of my invention.
Fig. 27 is another similar view to Figs. 24, 25 and 26 showing another modification of my invention.

In Fig. 26 the elastic body, 910y, is in the form of a flattened tube having thick walls, and is shown arranged in conjunction with a leg guard, as in Fig. 25. In this figure the parts corresponding with those shown in Figs. 1 to 6 inclusive are given the same reference numerals with the addition of 900. The flattened central portion passes beneath the pivot pin, the pin, 929a, extending through one end of the flattened tube, and the opposite end portion of the tube being engaged by pin, 929, brazed or otherwise secured to the arms, 933a and 933b of the guard. The swinging of the guard to set position will place the elastic body, 910y, under tension.

In Fig. 27 I have shown a further modification, the parts corresponding with those shown in Figs. 1 to 6 being given the same reference numerals with the addition of 1000. In this figure a thick strip of elastic material, 1010y, is wound around the pivot pin, 1032, and is provided at one end with an aperture engaging a cross bar, 1029, while the other end is apertured to receive the cross pin, 1029a, engaging the bracket. When the guard is swung to set position the elastic body, here held in helical form, will be placed under tension.

Figure 28:
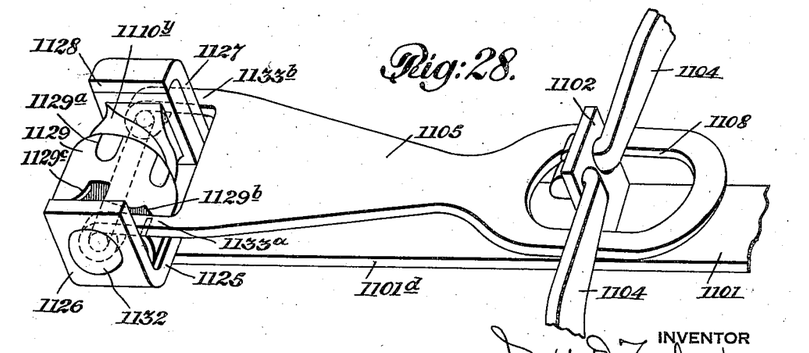
Fig. 28 is a partial perspective view of a trap showing the spring mechanism illustrated in Fig. 24 applied to the closing arm of a steel trap.

While I have shown the forms illustrated in Figs. 24 to 27 inclusive as applied to the operation of a pivoted leg engaging guard, it will be obvious that they may be applied in the same manner to operate a trap jaw directly, for example, in such a trap as is illustrated in Figs. 19 to 21, or indirectly through a closing arm, as illustrated in Fig. 28.

In Fig. 28 I have shown by way of example, the torsional elastic body previously illustrated in Fig. 24, operatively combined with the closing arm of a steel trap. In this figure the parts corresponding with those shown in Figs. 1 to 6 inclusive, are given the same reference numerals with the addition of 1100. The base, 1101, is provided with a pair of pivoted jaws, 1104, as indicated partially in the figure. An extension, 1101d, of the base, carries the bracket, 1125, provided with the elastic body, 1110y, of the form shown in Fig. 24, one end held from rotation by the bearing portion, while the other end carries the ratchet collar, 1129, previously described with reference to Fig. 24. 1105 represents the closing arm provided at one end with arms, 1133a and 1133b, bent into the form of eyes and engaging the pivot pin, 1132, extending through the elastic body, and the bearing portions of the bracket. The opposite end of the closing arm is provided with the usual slot, 1108, for engaging the jaws, 1104, and closing them and holding them in closed position. The parts are shown in set position with the elastic body under torsional strain. Obviously, on the release of the trigger mechanism, not shown in this figure, the stored energy of the elastic body will close the jaws and hold them closed in the usual manner, and by rotating the ratchet collar the tension of the elastic body can be regulated, as described with reference to Fig. 24.

While I have shown several forms of traps to illustrate my invention, I wish it to be understood that my invention is not limited to any or all of the particular forms shown, as it may be advantageously employed in any type of trap having animal restraining means including a movable member adapted to be held by trigger mechanism against the force of a yielding retraction element.

Wherever the word "rubber" occurs in the appended claims, I desire to have it understood that any material or composition is intended which comprises an elastic gum, such as rubber, its substitutes or equivalents.

What I claim and desire to secure by Letters Patent is:

1. In an animal trap having animal restraining means including a movable member, and trigger controlled means for holding it in set position, a yielding retraction element comprising a body of elastic rubber operatively connected with said member for returning said member to normal released position when released by said trigger controlled means.

2. In an animal trap having animal restraining means, including a pivoted member, and trigger controlled means for holding it in set position, a yielding retraction element comprising a body of elastic rubber held in distorted position when the trap is set and operatively connected with said member for returning it to normal released position, when released by said trigger controlled means.

3. In an animal trap having pivoted animal engaging means, and trigger controlled means for holding the same in set position, a body of elastic rubber held in distorted position when the trap is set, and a closing arm operatively connected with said body and with said animal engaging means, for returning the latter to normal released position when the trap is sprung.

4. In an animal trap having a pivoted jaw and trigger controlled means for holding it in set position, a body of elastic rubber, held in distorted position when the trap is set, and a pivoted closing arm operatively connected with said body, and having a part engaging said jaw for returning said jaw to normal released position when the trap is sprung.

5. In an animal trap having a pair of pivoted jaw members, and trigger mechanism therefor, a closing arm pivotally supported adjacent to one end and having adjacent to the other end a closing aperture engaging portions of said jaws, and a body of elastic rubber operatively engaging said closing arm and adapted to be distorted when the trap is set.

6. In an animal trap having a pair of pivoted jaw members, and trigger mechanism therefor, a closing arm pivotally supported adjacent to one end and having adjacent to the other end a closing aperture engaging portions of said jaws, and a body of elastic rubber operatively engaging said closing arm and adapted to be distorted when the trap is set, said closing arm and said body being provided with interengaging portions to hold said body in operative relation with the closing arm.

7. In an animal trap provided with a pair of pivoted jaws, and trigger mechanism therefor, a supporting member, a closing arm pivotally connected at one end with said supporting member and having its other end provided with a closing aperture engaging said jaws, and a body of resilient rubber interposed between said closing arm and said supporting member.

8. In an animal trap provided with a pair of pivoted jaws, and trigger mechanism therefor, a supporting member, a closing arm pivotally connected at one end with said supporting member and having its other end provided with a closing aperture engaging said jaws, and a body of resilient rubber interposed between said closing arm and said supporting member, and retaining means for holding said body against lateral and longitudinal movement with respect to said closing arm and supporting member.

9. In an animal trap provided with a pair of pivoted jaws, and trigger mechanism therefor, a supporting member, a closing arm pivotally connected at one end with said supporting member and having its other end provided with a closing aperture engaging said jaw, and a body of resilient rubber interposed between said closing arm and said supporting member, one of said body engaging parts and said body having interengaging parts to hold said body against movement.

10. In an animal trap provided with a pair of pivoted jaws, and trigger mechanism therefor, a supporting member, a closing arm pivotally connected at one end with said supporting member and having its other end provided with a closing aperture engaging said jaws, and a body of resilient rubber interposed between said closing arm and said supporting member, one of said body engaging parts being provided with lateral flanges for preventing lateral movement of said body, and one of said body engaging parts being provided with a projection engaging said body to hold it against longitudinal movement.

11. In an animal trap having pivoted jaws, and trigger mechanism therefor, a supporting member, a closing arm pivotally connected adjacent to one end to said supporting member and provided adjacent to its other end with jaw engaging portions, a body of resilient rubber interposed between said arm and said supporting member, and having a sealing engagement with one of said parts, the adjacent faces of the said parts in sealing engagement being constructed to form an air space.

12. In an animal trap having pivoted jaws, and trigger mechanism therefor, a supporting member, a closing arm pivotally connected adjacent to one end to said supporting member and provided adjacent to its other end with jaw engaging portions, a body of resilient rubber interposed between said arm and said supporting member, and having a sealing engagement with one of said parts, at least one of the adjacent faces of said parts in sealing engagement being provided with a recess to form an air pocket.

13. In an animal trap having pivoted jaws, and trigger mechanism therefor, a supporting member, a closing arm pivotally connected adjacent to one end to said supporting member and provided adjacent to its other end with jaw engaging portions, a body of resilient rubber interposed between said arm and said supporting member, the face of said body in contact with one of the parts engaged thereby being provided with a recess to facilitate the distortion of said body.

14. In an animal trap having pivoted jaws, and trigger mechanism therefor, a supporting member, a closing arm pivotally connected adjacent to one end to said supporting member and provided adjacent to its other end with jaw engaging portions, a body of resilient rubber interposed between said arm and said supporting member, the face of one of said parts in contact with said body being provided with a recess to facilitate the distortion of said body.

15. In an animal trap having pivoted jaws, and trigger mechanism therefor, a supporting member, a closing arm pivotally connected adjacent to one end to said supporting member and provided adjacent to its other end with jaw engaging portions, a body of resilient rubber interposed between said arm and said supporting member, the face of one of said parts in contact with said body member being provided with a recess, and the face of said body in contact with said part being provided with a cooperating recess, and with faces surrounding said recess in sealing contact with the contacting part, said recesses forming an air pocket.

16. In an animal trap having a pair of pivoted jaws, a supporting member, provided with lateral flanges, a closing arm having a portion at one end pivotally engaging said supporting member, and having a jaw closing aperture at the other end, said arm being rigid and provided with lateral flanges, and a body of resilient rubber interposed between said arm and supporting member adjacent to their pivotal engagement, and lying between said lateral flanges, and means for preventing the longitudinal movement of said body in a direction away from said pivotal engagement.

17. In an animal trap, provided with a pair of pivoted jaws, a supporting member, a closing arm provided at one end with closing means for engaging said jaws, and provided adjacent to its outer end with a part pivotally engaging said supporting member, said arm and supporting member having parts extending longitudinally beyond said pivotally engaging portions, a body of elastic rubber connecting said longitudinally extending portions of said arm and supporting member, a body of said material interposed between said arm and supporting member at the inner side of said pivotally engaging portions, and means for holding said bodies against longitudinal movement with respect to said arm and supporting member.

18. In an animal trap, provided with a pair of pivoted jaws, a supporting member, a closing arm provided at one end with closing means for engaging said jaws, and provided adjacent to its outer end with a part pivotally engaging said supporting member, said arm and supporting member having parts extending longitudinally beyond said pivotally engaging portions, a body of elastic rubber connecting said longitudinally extending portions of said arm and supporting member, portions of said body of material being interposed between said arm and supporting member at the inner side of said pivotally engaging portions, said portions being united and holding each other against longitudinal movement with respect to said arm and supporting member.

19. In an animal trap having animal restraining means including a pivoted member, and trigger mechanism for holding it in set position, a body of elastic rubber having a portion operatively connected with said member, and adapted to be rotated by the movement of said member in setting the trap, and means for holding other portions of said body against rotation.

20. In an animal trap having animal restraining means, including a pivoted member, and trigger mechanism for holding it in set position, a body of elastic rubber provided with polygonal portions, said body having a portion operatively connected with said member and adapted to be rotated with said member in setting the trap, and stationary holding means engaging polygonal portions of said body to hold it against rotation.

21. In an animal trap having pivoted animal engaging means, and trigger mechanism for holding it in set position, a body of elastic rubber, a closing arm operatively connected with a portion of said body, and engaging the said means, for rotating the said portion of said body when the trap is set, and stationary means engaging other portions of said body and holding it against rotation by the movement of said closing arm.

22. In an animal trap, animal restraining means including a pivoted member, energy storing means comprising a distortable body of resilient rubber, means operatively connected with the member for distorting said body to set the trap, and means releasable by an animal for holding said body in distorted energy storing condition.

23. In an animal trap having a base, animal restraining means including a pivoted member, a yielding retraction element comprising a distortable body of resilient rubber having one portion connected in fixed relation to the base, a movable member operatively connected with said pivoted member and engaging an opposite portion of the body to distort said body and to hold it in energy storing condition when the trap is set, and means releasable by an animal for holding said members in set position.

24. In an animal trap, provided with a pair of pivoted jaws, a supporting member, a closing arm provided at one end with closing means for engaging said jaws, means providing a fulcrum between said arm and supporting member adjacent to their outer ends, said arm and supporting member having parts extending longitudinally beyond said fulcrum, and a body of elastic rubber connecting said longitudinally extending portions of said arm and supporting member, and adapted to be placed under tension when the trap is set.

25. In an animal trap, provided with a pair of pivoted jaws, a supporting member, a closing arm provided at one end with closing means for engaging said jaws, means providing a fulcrum between said arm and supporting member adjacent to their outer ends, said arm and supporting member having parts extending longitudinally beyond said fulcrum, and a body of elastic rubber connecting said longitudinally extending portions of said arm and supporting member and adapted to be placed under tension when the trap is set, said longitudinally extending portions having curved portions diverging from each other and forming oppositely curved recesses to hold said body from longitudinal movement.

JOSEPH D. ZAHM.